United States Patent [19]
Kasper et al.

[11] Patent Number: 5,219,119
[45] Date of Patent: Jun. 15, 1993

[54] THERMOSTAT-TYPE SETBACK CONTROLLER HAVING A RECOVERY SET POINT WHICH DEPENDS ON THE TIME-BASED VALUE OF A SENSOR SIGNAL

[75] Inventors: Gary P. Kasper, Champlin; Gary A. Smith, Plymouth, both of Minn.

[73] Assignee: Honeywell Inc., Minneapolis, Minn.

[21] Appl. No.: 948,042

[22] Filed: Sep. 21, 1992

[51] Int. Cl.[5] .............................................. F23N 3/00
[52] U.S. Cl. .................................... 236/46 R; 165/12
[58] Field of Search ...................... 165/12; 236/46 R; 364/557

[56] References Cited

U.S. PATENT DOCUMENTS

| | | | |
|---|---|---|---|
| 4,522,336 | 6/1985 | Culp | 236/46 R |
| 4,557,317 | 12/1985 | Harmon, Jr. | 165/2 |
| 4,655,279 | 4/1987 | Harmon, Jr. | 165/2 |
| 4,702,413 | 10/1987 | Beckey et al. | 236/46 R |
| 4,901,917 | 2/1990 | Littell | 236/46 R |
| 4,911,358 | 3/1990 | Mehta | 236/46 R |
| 5,025,984 | 6/1991 | Bird et al. | 165/12 |

Primary Examiner—William E. Wayner

[57] ABSTRACT

A setback controller, typically a thermostat, controls a control unit which holds a condition within an enclosure at either a low energy consumption set point or a high energy consumption set point depending on the present time. The controller uses a recovery sensor to measure the state of a condition which can affect the rate at which recovery from the low energy to the high energy set point is likely to occur, and then starts recovery at a time consistent with the state of the condition so as to complete recovery at or near the time selected for the return to the high energy set point. The condition sensor may be located adjacent to the outside of the enclosure to sense one or more conditions. In a temperature control application, the recovery sensor may include a temperature sensor located outdoors near the controlled space and a wind velocity sensor.

13 Claims, 3 Drawing Sheets

THERMOSTAT-TYPE SETBACK CONTROLLER HAVING A RECOVERY SET POINT WHICH DEPENDS ON THE TIME-BASED VALUE OF A SENSOR SIGNAL

BACKGROUND OF THE INVENTION

The control of environments within enclosures is one of the major uses of energy. Maintaining space temperature by either heating or cooling the air within the enclosure is probably the most common type of this control. For at least the last 20 years, it has been known that significant energy savings are available by changing the set point at which the environmental condition is held to one of lower energy usage during certain intervals of the day or week. For example, during the heating season, an unoccupied space or one where occupants are sleeping may be allowed to reach a much lower temperature than is normally comfortable. During the air conditioning season, the space may be allowed to reach a much higher temperature and humidity when unoccupied. This change in set point from one having relatively high energy consumption to one having relatively low energy consumption during selected intervals during a day is called setback, and these intervals are known as setback intervals.

In order to avoid discomfort immediately after the end of the setback interval because temperature (or other parameter) has not reached its normal level, it is necessary to begin the change from the setback set point to the normal set point before the end of the setback interval. This is simply a reflection of the commonly understood fact that environmental control units such as furnaces, air conditioners, etc. cannot instantaneously change the temperature, humidity, or other controlled environmental condition. In order to make the use of energy saving setback operation acceptable to occupants, it is desirable to complete recovery to the normal condition before occupancy begins, or in the case of nighttime temperature cooldown setback, before the occupants arise in the morning. At the same time, it is undesirable to begin recovery to the normal temperature too soon, as this wastes energy.

In the first years of setback type control, the setback interval was fixed. Since the time required to complete setback varies depending on the thermal or other load on the controlled enclosure, this simple type of setback control began to fall out of favor with users. When there was little load on the control unit during the setback interval, less than the programmed time was typically necessary to complete recovery. On the other hand, when the load on the control system was near maximum, then the fixed recovery interval was insufficient and the occupants, upon returning to the enclosure or arising from sleep, were uncomfortable.

The availability of small, inexpensive microprocessors had a significant impact on the management of setback operation. Typical thermostats now use a microprocessor to program the starting and ending times of setback intervals. The computational and memory capabilities of microprocessors permit automatic weekly and yearly variations in the setback intervals based on predictable day to day changes in occupancy and seasonal changes in environmental loads. For example, if the setback interval starting and ending times were simply based on time of day, week, or year, one could program a setback thermostat to set back temperature in a home during Monday through Friday daytimes when residents are at work or school but not on weekends when occupants are likely to be at home. The night time starting time for the setback interval might well start earlier during the weekdays than during the weekend.

An obvious problem with this type of setback control is that it does not take into account the effect of external conditions on the length of the recovery interval. For example, outside winter temperatures can vary unpredictably in excess of a 40° F. range over a period of a few days or weeks. The resulting change in thermal load has a large impact on the length of the recovery interval required to return the enclosure to the normal or occupancy temperature.

The most sophisticated setback controllers base control of the recovery interval starting time on recent history of difference between the actual recovery time and the programmed recovery time. If the actual recovery time is too late, then it is a good bet to start the next day's corresponding recovery interval somewhat earlier. Conversely, if the actual recovery time is too early, then the next day's recovery interval can be started somewhat later. While this results in relatively accurate recovery interval start times, it does require a relatively large memory in the thermostat's microprocessor for this historical data. If for some reason the microprocessor loses power for even a brief time, then this historical data is lost unless there is an on-board backup power supply. And the ability to process this relatively large amount of data requires the microprocessor to have sophisticated software and a larger program memory as well. Such a microprocessor system is relatively expensive in the current market context, even with the constantly dropping prices of such devices.

The significant constraint on the cost of added capability in a setback controller arises from two different considerations. These are first, the energy savings which may be realized by increased accuracy of controlling recovery. The savings which extending setback by a few minutes realizes does not justify more than a modest increase in the cost of the controller as a whole. Secondly, there is the inconvenience cost arising from the discomfort of the occupants when recovery is not completed by the desired time. If the price differential of high capability versus a low capability controller is not clearly justified by these two factors, then it will not be a commercial success. When the price to the end user of the added features becomes a significant fraction of the value of energy which will be saved by the controller over its projected life, then the features will not appeal to prospective users.

U.S. Pat. Nos. 4,702,413 and 4,702,305 disclose a setback thermostat for use with a heating system having two different heating plants. The time at which recovery is started depends on miss times experienced at the end of previous recovery intervals.

U.S. Pat. No. 4,522,336 teaches control of building temperature including a setback phase. The time at which recovery to the occupancy temperature during the setback interval is started to assure reaching occupancy temperature at the desired time depends on the errors recorded for previous recovery intervals.

BRIEF DESCRIPTION OF THE INVENTION

A controller such as thermostat has an energy saving setback feature for providing a control signal to manage operation of a control unit. The control unit changes an environmental condition within an enclosure. The control unit may be a furnace or an air conditioner for example if the environmental condition is temperature. The setback feature of the controller causes the control unit, during at least one preselected setback interval defined by selected starting and ending times of day, to hold the environmental condition at a predetermined low energy consumption level set point value encoded in a setback set point signal. These starting and ending times are encoded in a setback time signal. The controller causes the control unit to hold the environmental condition at a predetermined higher energy consumption level set point encoded in a normal set point signal during a normal energy use interval following the setback interval. The controller has a condition sensor providing a condition signal encoding the current condition value within the enclosure, a clock providing a time of day signal indicative of the time of day, and condition control means receiving the condition signal and a current set point signal encoding a current set point value for providing the control signal responsive thereto. The typical embodiment of the controller is a setback thermostat.

The improved setback feature of this controller allows accurate recovery to the high energy consumption level set point without the need for recording any historical data concerning recovery miss times. The controller comprises at least one recovery sensor measuring a recovery parameter affecting the time required for recovering from the low energy consumption level set point to the high energy consumption level set point. Each recovery sensor provides a recovery sensor signal encoding the recovery parameter value. The controller also includes recovery condition computing means receiving each recovery sensor signal. These computing means compute a recovery time interval as a function of the recovery sensor signal and encode the recovery time interval value in a recovery time signal. The controller also includes set point signal generator means receiving the time of day signal, the setback set point signal, the normal set point signal, the setback time signal, and the recovery time signal. The generator means provide the current set point signal encoding a current set point whose value varies with time and is dependent on the values encoded in the time signal, the setback set point signal, the normal set point signal, the setback time signal, and the recovery time signal.

It should be noted that the recovery sensor need not be located outside the enclosure. There may well be current conditions within the enclosure itself which will have significant impact on the time required to complete recovery and which can be effectively utilized for accurate recovery. For example, the temperature change across an air to air heat exchanger might be useful in determining the time required to recover to the comfort temperature in a temperature setback system.

DESCRIPTION OF THE PREFERRED EMBODIMENT

Figure 1:
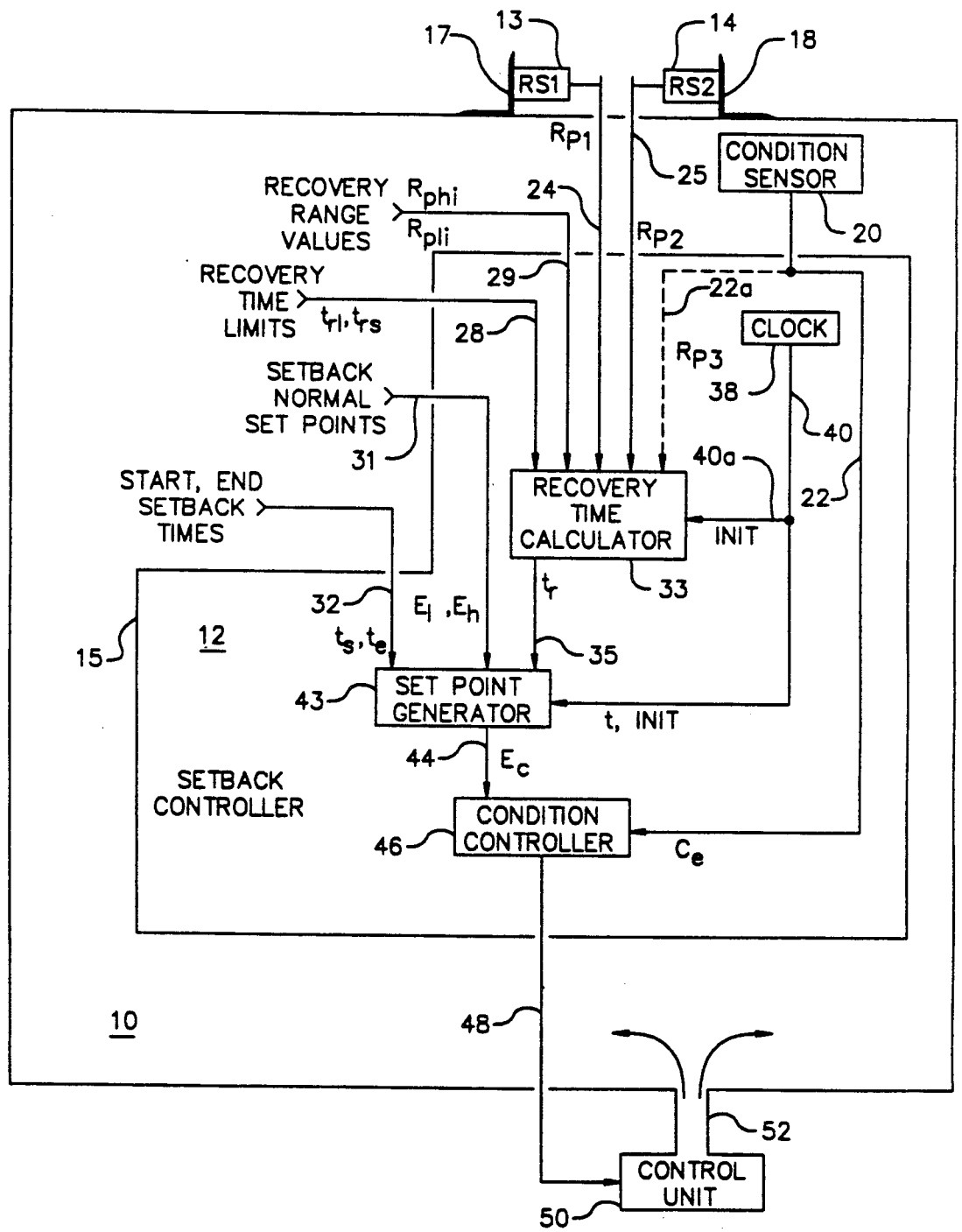
FIG. 1 is a block diagram of a condition controller with a setback feature.

The block diagram of FIG. 1 shows a complete environmental control system, including the enclosure 10 whose interior condition is modified by operation of a control unit 50. In the example shown, control unit 50 may be a furnace or air conditioner supplying heated or cooled air through a duct 52 to enclosure 10. A setback controller 12 has its control function elements mounted within a housing 15. Both enclosure 10 and housing 15 are penetrated by signal paths such as path 24 for example, and these signal paths are shown symbolically as passing through small openings of the enclosure and housing. The controller 12 may be mounted within the enclosure 10 or may be mounted near the control unit 50. A condition sensor 20 is mounted within the enclosure 10 so as to allow the condition within the enclosure to be controlled to be accurately sensed. It is common where the controlled parameter is temperature and controller 12 is a thermostat that the condition sensor 20 is integral with the controller 12. When the controller is mounted within enclosure 10 as shown in FIG. 1, sensor 20 may be mounted immediately outside of the housing 15, or can be mounted near louvres or openings in housing 15. In other installations, the sensor 20 may be located remotely from the controller 12. The condition sensor 20 provides on path 22 a signal encoding the current value $C_e$ of the condition within the enclosure to be controlled.

In a substantial number of cases, the condition to be controlled by controller 12 will be temperature, and in this case, controller 12 is nothing more than a sophisticated setback thermostat. However, there are a number of other environmental conditions as well such as humidity, light level, and dust which may be profitably held at one level when the enclosure is unoccupied and at another level requiring higher energy when occupied, and which cannot be changed rapidly to accommodate a change in occupancy. For the remainder of the description, it is easiest to consider the controlled environmental variable as temperature and the whole system as operating in heating mode.

Figure 3:
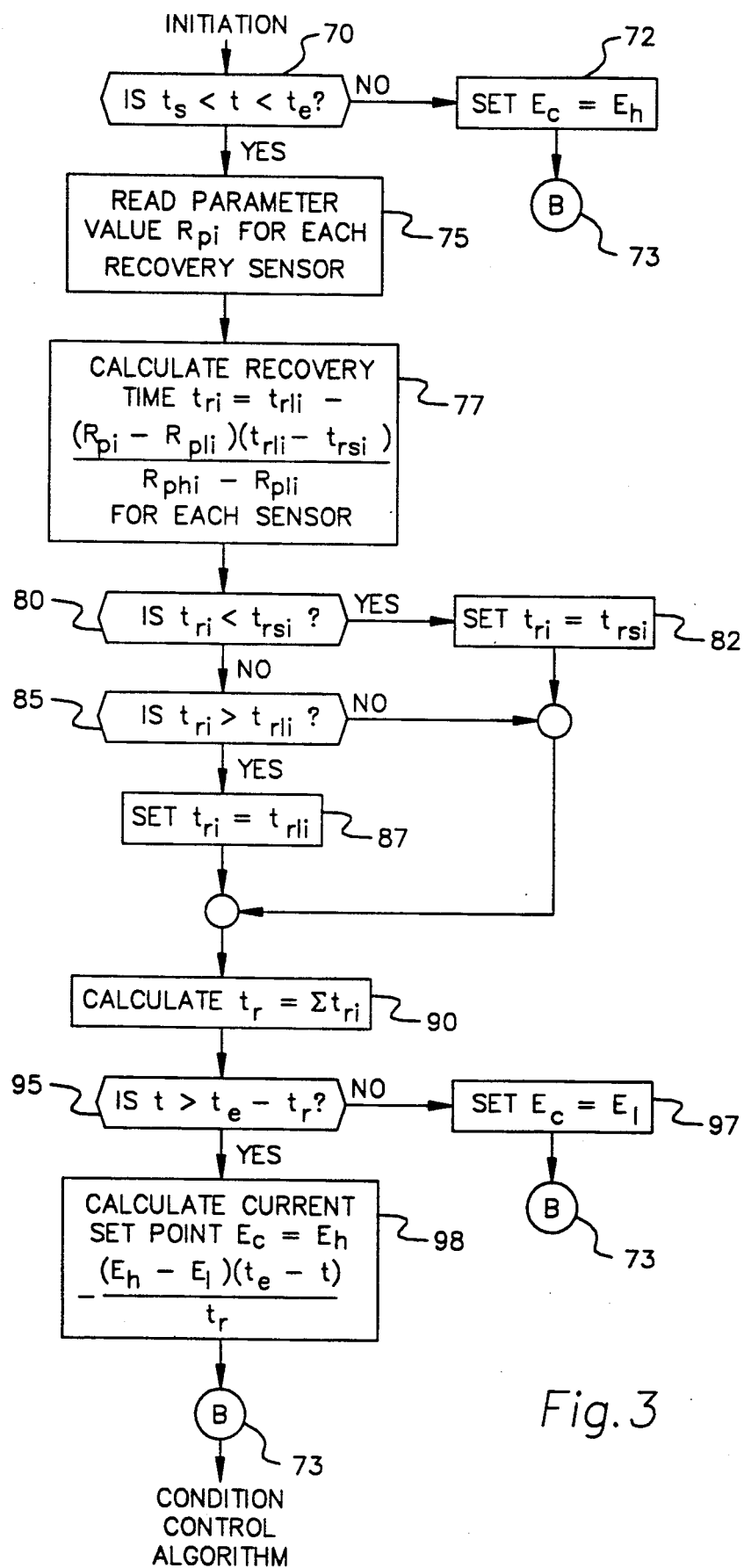
FIG. 3 is a flow chart defining software which can be used in a microprocessor for implementing the functions of a setback type of condition controller.

The controller 12 is shown as comprising a number of functional elements, with signal paths connecting them to each other. It is in fact most efficient to use a single properly programmed microprocessor to provide these functions. FIG. 3, which will be described later, define the structure of a program which may be used by a microprocessor to implement the invention. However, the reader should understand that even within a microprocessor implementing this invention, the individual functional elements shown within housing 15 have an actual physical existence during the time that their actual functions are performed by the microprocessor. In essence, the microprocessor briefly becomes these individual functional elements, with the microprocessor's communication function forming the signal paths.

The interface by which the human operator can communicate with the controller 12 is not shown. Those skilled in this art will be familiar with the input keys and display of a microprocessor-based programmable setback thermostat, and this is what we contemplate as this interface.

The internal condition of enclosure 10 may be altered by providing a control signal on path 48 to control unit 50. In the case where temperature is the controlled variable, control unit 50 will be a familiar furnace or air conditioner, as mentioned earlier.

There are a number of different user-set parameters which must be loaded into the controller before operation as we contemplate is possible. There are also a number of different variable parameters, either internally or externally generated, which are necessary for operation of the controller. Labels on the data paths which carry these various parameters identify the data carried on each.

The following legend defines the various letter symbols used for these parameters in the following discussion. Symbols including a lower case t refer to time, either a constant or a variable and either a time of day or a the length of a time interval. Symbols including an upper case E refer to a set point for a controlled environmental condition within the enclosure, which condition typically but not invariably will be temperature. Symbols including an upper case R define the value or level of a condition, usually but not invariably outside the enclosure, which can affect the length of the recovery interval and which is generally referred to as a recovery parameter. We expect that at least one of the R values will be a temperature if E is a temperature.

SIGNAL LEGEND $t_4$—calculated length of the recovery interval $t_{rli}$—longest time allowed for the ith sensor's recovery interval $t_{rsi}$—shortest time allowed for the ith sensor's recovery interval $t_e$—time of day to end recovery, i.e., start of high energy usage period $t_s$—time of day to start setback, i.e., start of low energy usage period $t$—current time of day $E_h$—the high energy (normal) usage level enclosure condition set point (before and after setback)

$E_1$—the low energy usage level enclosure condition set point (during setback before recovery starts)

$E_c$—the current enclosure condition set point (periodically calculated)

$C_e$—the measured current enclosure condition value $R_{pi}$—recovery parameter value sensed by the $i^{th}$ recovery sensor; $R_{p3} = C_e$ in the example system $R_{phi}$ and $R_{pli}$—nominal high and low values of $R_p$ respectively for the ith recovery sensor; used for adjusting gain in set point calculations With digital setback thermostats, it is necessary to provide a signal encoding the current time of day, and usually the day of the week as well. In the apparatus of FIG. 1, a clock 38 provides a time of day signal on path 40, as well as commonly, the day of the week. Further, in these thermostats, it is necessary to periodically calculate the difference between the current set point $E_c$ and the enclosure condition $C_e$. It is therefore necessary to provide what will be called an initiator (INIT) signal which has a level change at frequent intervals, commonly every minute. Each time the level change of the initiator signal is sensed by the controller 12, a comparison of the current set point and the enclosure condition is made, if the difference is outside of a preselected control range, a change in the operation of control unit 50 is directed to cause the enclosure condition as sensed by condition sensor 20 to change.

Instead of relying on previous errors to determine the proper time for starting recovery during a setback interval from the setback set point to the normal set point as has been the common practice, the apparatus described here relies on measured values of environmental conditions measured by one or more recovery sensors. In the apparatus of FIG. 1, three recovery sensors are shown. Recovery sensors RS1 and RS2 (ref. nos. 13 and 14) are mounted respectively on brackets 17 and 18 fastened to the outside surface of enclosure 10. As indicated in the signal legend above, these recovery sensors 13 and 14 provide signals on paths 24 and 25 respectively encoding recovery parameter values $R_{p1}$ and $R_{p2}$. In a typical installation where the controlled condition within enclosure 10 is temperature, recovery sensor one 13 may sense temperature external to enclosure 10, and recovery sensor two 14 may sense wind speed in the vicinity of enclosure 10.

An additional feature of this invention is the ability to use an internal condition of enclosure 10 as a recovery parameter for controlling the start of recovery. In FIG. 1, condition sensor 20 comprises the third recovery sensor and is shown as providing a third recovery parameter value $R_{p3}$ encoded in a signal on path 22a, shown as a dotted line to indicate the optional nature of this input.

A recovery time calculator 33 receives the recovery parameters $R_{p1}$, $R_{p2}$, and if specified as an input, $R_{p3}$ respectively carried on paths 24, 25 and 22a. In addition, there are recovery time limits and nominal recovery range values preset by the operator which are used to compute a recovery time. The recovery time limits $t_{rl}$ and $t_{rs}$ specify the longest and shortest times respectively allowed for the recovery time. The recovery range values are specified for each recovery sensor 13, 14, etc. and are nominal high and low values expected for each parameter. The values sensed by a sensor may of course fall outside the specified range without causing a problem. The purpose of these ranges is to provide some control of gain or response of the algorithm by which recovery time calculator 33 calculates the recovery time. The recovery interval as calculated by calculator 33 is encoded in a signal provided on path 35.

The equation used by calculator 33 to determine a recovery interval as a function of these various values and coefficients can have many different forms. In the broadest form of our invention, we leave the actual equation to the choice of the person implementing the invention. Those skilled in the art will no doubt be able to select a suitable functional relationship between the recovery sensors' parameter values and the recovery interval which allows recovery to start at a time which provides a high level of assurance that recovery is complete by the end of the setback interval and at the same time does not result in the enclosure condition reaching the high energy set point at an unduly early time.

One functional relationship which we prefer has a linear response to changes in the parameter value sensed by a recovery sensor 13, 14, etc. This equation will be discussed in detail in connection with the software flow chart of FIG. 3. Where multiple recovery sensors 13, 14, etc. are used, we prefer a superposition approach, where first a sensor recovery time interval $t_{r1}, t_{r2}, \ldots t_{ri}, \ldots t_{rn}$ is respectively calculated for sensor one, sensor two, etc. through sensor n, and then the individual sensor recovery time intervals $t_{ri}$ calculated for each sensor 13, 14, etc. are summed as a value $\rho$ tri=$t_r$. With this arrangement, a single recovery sensor system becomes a special case of a multiple recovery sensor system, where $\rho\ t_{ri} = t_{r1} = t_r$.

As explained above, the level changes in the initiator signal carried here on path 40a causes a new recovery interval to be calculated. Since the time interval between individual level changes in the initiator signal is relatively short compared to the length of a typical recovery time interval $t_r$, it is possible to compute a number of different recovery interval lengths during an actual recovery operation, allowing accurate convergence of the enclosure condition on the set point value.

With a recovery interval length $t_r$ specified on path 35 by a fresh calculation, this apparatus next computes a new set point for the interval from the current level change in the initiator signal to the next. A set point generator 43 provides to a condition controller 46, a value $E_c$ which is the current set point. The condition controller 46 then determines whether the control unit 50 should be activated based on the difference between the current set point $E_c$ and the level of the enclosure condition $C_e$ encoded in the sensor signal on path 22. Of course, it is possible to also use a proportional control where control unit 50 is of the type allowing such.

Figure 2:
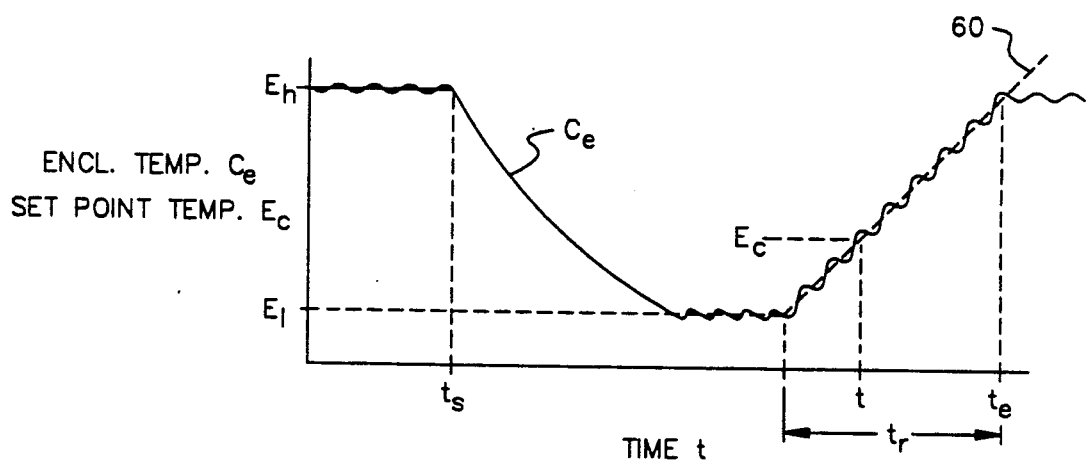
FIG. 2 is a plot of a temperature set point versus time for a heating setback situation where the invention is employed.

The algorithm used by set point generator 43 to derive the current set point $E_c$ is dependent on the current time of day t, as well as the start and end setback times $t_s$ and $t_e$ encoded in the signal on path 32 and the setback and normal set point values El and $E_h$ encoded in the signal on path 31. Recall that these values are also provided by the operator for storage in the microprocessor memory before the actual setback operation of the controller 12 begins. By comparing the time of day t encoded in the time signal on path 40 from clock 38 with the start setback time $t_s$ encoded in the signal on path 32, it can be easily determined when to begin a setback interval. In FIG. 2, when $t=t_s$ the current set point $E_c$ is changed by set point generator 43 from $E_h$ to $E_1$ and the temperature then slowly drifts down to $E_1$ as the interior of enclosure cools. This is well known practice.

At all times, and in particular during this setback interval, at each one minute interval $t_r$ is recalculated by calculator 33. When the time remaining to the end of the setback interval finally becomes smaller than the recovery time interval $t_r$, generator 43 periodically calculates a transitional set point falling between $E_1$ to $E_h$ according to the values encoded in the input signals encoded on paths 31, 32, and 35. Before this condition occurs, the low energy set point $E_1$ is used as $E_c$. This transitional set point value is always between $E_1$ and $E_h$ inclusive and may be determined in a number of different ways. Our preference in this regard is to use the current value of $t_r$ and $t_e$ along with the setback and normal set point values $E_1$ and $E_h$ to define for the succeeding minute in response to each level change in the initiator signal, the slope of a recovery line 60 passing through the point defined by the values $E_h$ and $t_e$. The point on that line corresponding to the current time t becomes the current set point $E_c$ encoded in the signal on path 44 and provided to the condition controller 46. The equation for the current set point $E_c$ which implements this algorithm is $$E_c = E_h - [(t_e - t)(E_h - E_1)/t_r]$$

The slope of the recovery line 60 is $(E_h - E_1)/t_r$. Assuming $E_h$ and $E_1$ do not change during a recovery interval, then only $t_r$ affects the slope of line 60. If $t_r$ also does not change, the slope of the recovery line 60 does not change, and the current set point $E_c$ changes linearly from one minute to the next. As an example of a calculation for a set point during a recovery interval where $t_r$ does not change, assume the following values exist:

$E_h = 70$ ° F.
$E_1 = 60$ ° F.
$t_e = 8:00$ AM
$t = 7:15$ AM
$t_r = 120$ minutes Then $E_c = 70$ ° F. $- [(8:00 - 7:15)(70$ ° F. $- 60$° F.$)/120$ min.$] = 66.25$ ° F. It can be seen that $E_c$ changes lineraly as t increased from minute to minute.

There will often be conditions where the calculated value of $E_c$ will be less than $E_1$. In this case, $E_c$ is set equal to $E_1$. These conditions typically arise early in a setback interval where the slope specified by $(E_h - E_1)/t_r$ is large relative to the length of the setback interval.

If the conditions sensed by the recovery sensors 13, 14, etc. change during the recovery interval, then the slope of the recovery line 60 changes to reflect this situation. This is logical, because for example, reduced heating load on the enclosure during a recovery interval will shorten the length of the recovery interval required. This situation will result in a calculated recovery interval length $t_r$ which is shorter, increasing the slope of the recovery line. And of course, if the situation(s) sensed by the recovery sensors 13, 14, etc. differ from recovery period to recovery period, then the different recovery interval length $t_r$ calculated results in a different slope for recovery line 60 from period to period.

It is possible that at times during a recovery interval, a particular recalculation of $t_r$ returns a value which is smaller than $t_e - t$. In the heating situation shown, this results in a calculated current set point $E_c$ smaller than the setback set point $E_1$. We prefer in this case to set the current set point to the setback (low energy) set point value $E_1$. As an example of this situation, consider the example above where when $t = 7:15$, $t_r$ changes from 120 minutes to 40 minutes. This results in an calculated value of $E_c = 70°$ F. $- [(8:00 - 7:15)(70$ ° F. $- 60$ ° F.$)/40$ min.$] = 58.75$ ° F. Since 58.75 ° F. is less than the specified value of $E_1 = 60$ ° F., the value which this feature of the algorithm provides for $E_c$ is 60° F.

While a linear recovery curve is obviously not optimal from a maximum efficiency standpoint, the actual reduction in overall efficiency relative to an ideal curve is relatively slight. Once the various constants provided by the user have been set properly, our experience in test sites and the results of simulations indicate that both excellent recovery accuracy and excellent energy efficiency result from use of this algorithm. At the same time, there is no need to hold previous recovery error data in the microprocessor memory.

Condition controller 46 provides a control signal on path 48 which operates control unit 50 to drive the condition in enclosure 10 closer to the current set point $E_c$. Thus, in a simple heating situation in a residence where the furnace is not proportionally controllable, the furnace (control unit 50) will be turned on whenever the current set point $E_c$ (the thermostat setting) is greater than $C_e$ (the interior temperature). This assumes absence of other considerations in the control algorithm arising from constraints on the cycle rate, etc. The calculated length of the recovery interval $t_r$ must be long enough to accommodate such concerns.

One case which should be mentioned specifically is where the only recovery sensor is the condition sensor 20. This is a configuration which we specifically include in the scope of our invention. The actual slope of the recovery line 60 for this configuration depends on a number of factors, including the response curve of the control unit 50 and the actual capacity of the control unit 50 relative to the load presented by enclosure 10. By properly selecting a maximum $t_r$ in this circumstance, the recovery interval will be adequate for even the highest heating loads on enclosure 10 when $C_e$ reaches $E_1$ early in the setback interval. At the same time, when $C_e$ does not reach $E_1$ during the setback interval, a shorter $t_r$ will be calculated allowing accurate recovery to $E_h$.

FIG. 3 shows a flow chart defining one preferred software embodiment for implementing this invention in a microprocessor. We follow familiar flow charting conventions, where hexagonal boxes such as at 70 denote a decision element and rectangular boxes such as at 75 denote elements which perform an activity of some sort. We emphasize that each of these elements has a physical existence at the times that its function is performed. That is, when the individual instructions performing the function of a particular element are executed, parts of the microprocessor become in effect a physical embodiment of the element. As soon as the function has been completed, of course, then that element vanishes and the microprocessor becomes the next element whose function is to be performed.

Execution of the instructions which implement this invention starts with those of decision element 70 per the one minute level changes in the initiator signal on path 40 of FIG. 1. Other instructions within the microprocessor transfers execution to the instructions of element 70, by which the inequality $t_s < t < t_e$ is sensed. If the inequality does not exist at the present time, this means that the system is not currently in setback mode and instruction execution transfers to activity element 72. The instructions of element 72 cause the current set point value $E_c$ to be set to the normal set point $E_h$, and no further implementation of the invention occurs, execution of instructions being then transferred through exit element 73 to other software modules within the microprocessor.

If the inequality of element 70 is satisfied, the setback mode currently exists, and it is necessary to determine whether recovery should begin. The various parameter values $R_{pi}$ currently sensed by recovery sensors 13, 14, etc. of FIG. 1 are read into the microprocessor memory by the instructions of activity element 75. The value $R_{pi}$ is the parameter value sensed by the $i^{th}$ recovery sensor at the current time.

The instructions of activity element 77 next are performed to calculate a recovery time $t_{ri}$ for each individual sensor 13, 14, etc. As mentioned in connection with FIG. 1, there are many different equations which may be used to determine the particular value of $t_{ri}$ for the $i^{th}$ sensor. One which we prefer is shown in activity element 77 and sets the recovery interval $t_{ri}$ for the $i^{th}$ sensor to $t_{ri} = t_{rli} - [(R_{pi} - R_{pli})(t_{rli} - t_{rsi})/(R_{phi} - R_{pli})]$, where each of the values except for the variable condition sensor parameter value $R_{pi}$, are preset by the operator for the particular sensor. As an example of this calculation, assume that $T_{rli}$ = 180 minutes
$t_{rsi}$ = 10 minutes
$R_{pli}$ = $-10°$ F.
$R_{phi}$ = 60° F.
$R_{pi}$ = 10° F.

Then $t_{ri} = 180$ min. $- \{[10°$ F. $-(-10°$ F.$)][180$ min. $- 10$ min.$]/[60°$ F. $-(-10°$ F.$)]\} = 131.4$ minutes.

We prefer to impose limits on the individual values of $t_{ri}$ as established by the inequalities $t_{rsi} \leq t_{ri} \leq t_{rli}$, and elements 80, 82, 85, and 87 perform this activity. If $t_{rli} < t_{ri}$ is true, then $t_{ri}$ is set equal to $t_{rli}$ by decision element 85 instructions and activity element 87 instructions. If $t_{ri} < t_{rsi}$ is true, then $t_{ri}$ is set equal to $t_{rsi}$ by decision element 80 instructions and activity element 82 instructions.

While there are a number of different algorithms for forming a composite value $t_r$ based on the n individual values $t_{ri}$, our preference is to use simple superposition and set $t_r$' $t_{ri}$, where the summation is evaluated for $1 < i < n$. This summation is performed by the instructions of activity element 90.

Instruction execution continues to decision element 95, which represents instructions which test whether the current time of day has entered the recovery interval specified by the current value of $t_r$. If $t > t_e - t_r$ is not true, then the current set point $E_c$ is set to the setback set point $E_1$, and instruction execution continues at connector B 73 to perform the condition control algorithm instructions which cause the function of element 46 in FIG. 1 to be done. If $t > t_e - t_r$ is true, then $E_c$ is set to $E_c = E_h - [(t_e - t)(E_h - E_1)/t_r]$ as explained in connection with FIG. 1. Execution of instructions then continues with the instructions at connector B 73. As an example, if $t_e$ is 8:00 AM and $t_r$ = 120 minutes, then execution continues directly to connector B 73 from decision element 95 and $E_c$ remains equal to $E_1$ until the current time t reaches 6:01 AM.

We have found that use of the algorithm taught in our invention makes it possible to accurately control the start of recovery from a setback set point to a normal set point without the necessity of maintaining a history of recovery error. Individual installations can be tailored to the special features and characteristics they and their environment have by properly selecting the preset values used in the two equations and by selecting the proper external sensors.

The preceding has described our invention. What we wish to protect by letters patent is:

We claim:

1. A controller with an energy saving setback feature for providing a control signal to manage operation of a control unit for changing an environmental condition within an enclosure so as, during at least one preselected setback interval defined by selected starting and ending times of day, to hold the environmental condition at a predetermined low energy consumption level set point value encoded in a setback set point signal, said starting and ending times encoded in a setback time signal, and to hold the environmental condition at a predetermined high energy consumption level set point encoded in a normal set point signal during the remainder of the day, said setback type controller having a condition sensor providing a condition signal encoding the current condition value within the enclosure, a clock providing a time of day signal indicative of the time of day, and condition control means receiving the condition signal and a current set point signal encoding a current set point value for providing the control signal responsive thereto, an improvement comprising a) at least one recovery sensor measuring a recovery parameter affecting the time required for recovering from the low energy consumption level set point to the high energy consumption level set point, each recovery sensor providing a recovery sensor signal encoding the recovery parameter value;

b) recovery time calculator means receiving each recovery sensor signal for computing a recovery time interval as a function of the recovery sensor signal and encoding the recovery time interval value in a recovery time signal; and c) set point signal generator means receiving the time of day signal, the setback set point signal, the normal set point signal, the setback time signal, and the recovery time signal, for providing the current set point signal encoding a current set point whose value varies with time and is dependent on the values encoded in the time signal, the setback set point signal, the normal set point signal, the setback time signal, and the recovery time signal.

2. The setback controller of claim 1, wherein the set points are temperatures, and wherein the condition sensor is a first temperature sensor and at least one recovery sensor is a second temperature sensor.

3. The setback controller of claim 2, including a sensor mount attached adjacent to the exterior of the enclosure, and supporting the second temperature sensor.

4. The setback controller of claim 1, wherein the recovery time calculator means comprises first function means receiving a recovery time limit signal encoding at least one duration limit value bounding the recovery time interval, for further calculating the recovery time interval value as a function of each duration limit value encoded in the recovery time limit signal.

5. The setback controller of claim 4, wherein the first function means comprises second function means receiving a recovery range signal encoding a recovery parameter range value encoding a nominal extreme of the recovery parameter, for further calculating the recovery time interval value as a function of the recovery range signal.

6. The setback controller of claim 5, wherein the second function means comprises third function means receiving encoded in the recovery time limit signal, long and short duration limit values $t_{rl}$ and $t_{rs}$ respectively, and encoded in the recovery range signal, high and low recovery parameter nominal values $R_{ph}$ and $R_{pl}$ respectively, for further calculating the recovery time interval value $t_r$ as $t_{rl}-(R_p-R_{pl})(t_{rl}-t_{rs})/R_{ph}-R_{pl})$, where $R_p$ is the current recovery parameter value.

7. The setback controller of claim 6, wherein the set point signal generator means includes means receiving the time of day signal for providing a level transition in an initiator signal at preselected intervals, and set point calculating means receiving the initiator signal for calculating the current set point value responsive to each initiator signal level transition.

8. The setback controller of claim 7, wherein the set point calculating means comprises means active during the recovery interval for calculating a current set point $E_c=E_h-[(E_h-E_l)(t_e-t)/t_r]$.

9. The setback controller of claim 6, wherein the third function means further comprises means limiting the value of $t_r$ to within the range from $t_{rl}$ to $t_{rs}$.

10. The setback controller of claim 5, comprising at least two recovery sensors, wherein the second function means comprises third function means receiving encoded in the recovery time limit signal, long and short duration limit values $t_{rl}$ and $t_{rs}$ respectively, and encoded in the recovery range signal for each recovery sensor, high and low recovery parameter nominal values $R_{ph}$ and $R_{pL}$ respectively, for further calculating for each recovery sensor a recovery time interval value component equal to $t_{rl}-(R_p-R_{pl})(t_{rl}-t_{rs})/(R_{ph}-R_{pl})$ using for each value component the values $R_{ph}$ and $R_{pl}$ for each recovery sensor, and where $R_p$ is the current recovery parameter value for the sensor involved, and for forming as the recovery time interval $t_r$, the sum of each recovery time interval value component.

11. The setback controller of claim 10, wherein the third function means comprises means active during the recovery interval for calculating a current set point $E_c=E_h-[(E_h-E_l)(t_e-t)t_r]$.

12. The setback controller of claim 1, wherein the condition sensor comprises one recovery sensor.

13. The setback controller of claim 1, including at least two recovery sensors, and further including in the recovery time calculator means, means for computing for each recovery sensor a sensor recovery time interval value, and means for forming as the recovery time interval length value, the sum of each of the sensor recovery time interval values.

* * * * *